United States Patent [19]

Dzung et al.

[11] Patent Number: 5,109,540
[45] Date of Patent: Apr. 28, 1992

[54] RADIO AND ELECTRONIC CARD ASSEMBLY

[75] Inventors: John C. Dzung, Sunrise; Timothy A. Monahan-Mitchell, Deerfield Beach; Emilio J. Quiroga, Pompano Beach; Craig F. Siddoway; Randall P. Chambers, both of Ft. Lauderdale, all of Fla.

[73] Assignee: Motorola, Inc., Schaumburg, Ill.

[21] Appl. No.: 701,351

[22] Filed: May 10, 1991

Related U.S. Application Data

[63] Continuation of Ser. No. 345,262, May 1, 1989, abandoned.

[51] Int. Cl.$^5$ .......................... H04B 1/38; H04B 1/08
[52] U.S. Cl. .................................... 455/89; 455/90; 455/348; 455/349; 455/351
[58] Field of Search ........................ 455/89–90, 455/347–349, 351, 186; 340/311.1; 361/392, 394, 422; 312/7.1

[56] References Cited

U.S. PATENT DOCUMENTS

| | | | |
|---|---|---|---|
| 4,177,426 | 12/1979 | Gaishin et al. | 455/349 |
| 4,283,796 | 8/1981 | Hughes | 455/349 |
| 4,641,370 | 2/1987 | Oyamada | 361/422 |
| 4,718,110 | 1/1988 | Schaefer | 455/90 |

Primary Examiner—Reinhard J. Eisenzopf
Assistant Examiner—Andrew Faile
Attorney, Agent, or Firm—Daniel K. Nichols

[57] ABSTRACT

A portable two-way radio includes a radio portion and a battery removably attached to the radio portion. The radio portion includes an opening that is accessible when the battery is removed. An electronic card is received by the radio portion through the opening. When reassembled, the battery retains the electronic card in the radio portion.

5 Claims, 4 Drawing Sheets

RADIO AND ELECTRONIC CARD ASSEMBLY

This is a continuation of application Ser. No. 07/345,262, filed May 1, 1989, and now abandoned.

BACKGROUND OF THE INVENTION

This invention relates to radios in general and particularly to a portable radio utilizing a removable electronic card.

Radios, such as, portable two-way radios are often manufactured to have various options and programmable capabilities. For example, a synthesized two-way radio can include a code plug which can be a removeable memory device. The code plug includes information such as the divisor information for the radio's frequency synthesizer. Other stored control information can relate to coded squelch information, channel scanning, and a myriad of other features and options. Additional, such radios can be configured so that one or more modules can be inserted into the radio to provide particular desired feature. For example, voice encryption, encoding or decoding or other selective signalling circuitry can be included as an optional module. In the known prior art radios, to change an electronic module, it is necessary to have the radio serviced by a trained technician, as such changes are internal to the radio are not readily accessible to the radio user. Electronic modules, code plugs, or other electronic cards are located internally to the radio, in order to provide physical protection for the module. It is desirable to have a radio that a user could readily modify to his particular requirements by insertion or changing of an electronic card.

SUMMARY OF THE INVENTION

This portable radio electronic card assembly provides user access to an electronic card while providing mechanical and electrical protection for the radio and electronic circuitry.

The portable radio electronic card assembly includes a radio portion and a battery portion attached to the radio portion. The radio portion has an opening for receiving an electronic card. The opening is only accessible when the radio portion and battery portion are detached. When they are interconnected, the opening is inaccessible for insertion or removal of an electronic card.

In one aspect of the invention, the battery portion includes means for retaining the electronic card. In another aspect of the invention, the battery portion includes a lip and at least a portion of the electronic card retaining means is located on the lip. In still another aspect of the invention, the battery portion is slideably attached to a radio portion.

DESCRIPTION OF THE PREFERRED EMBODIMENT

Figure 1:
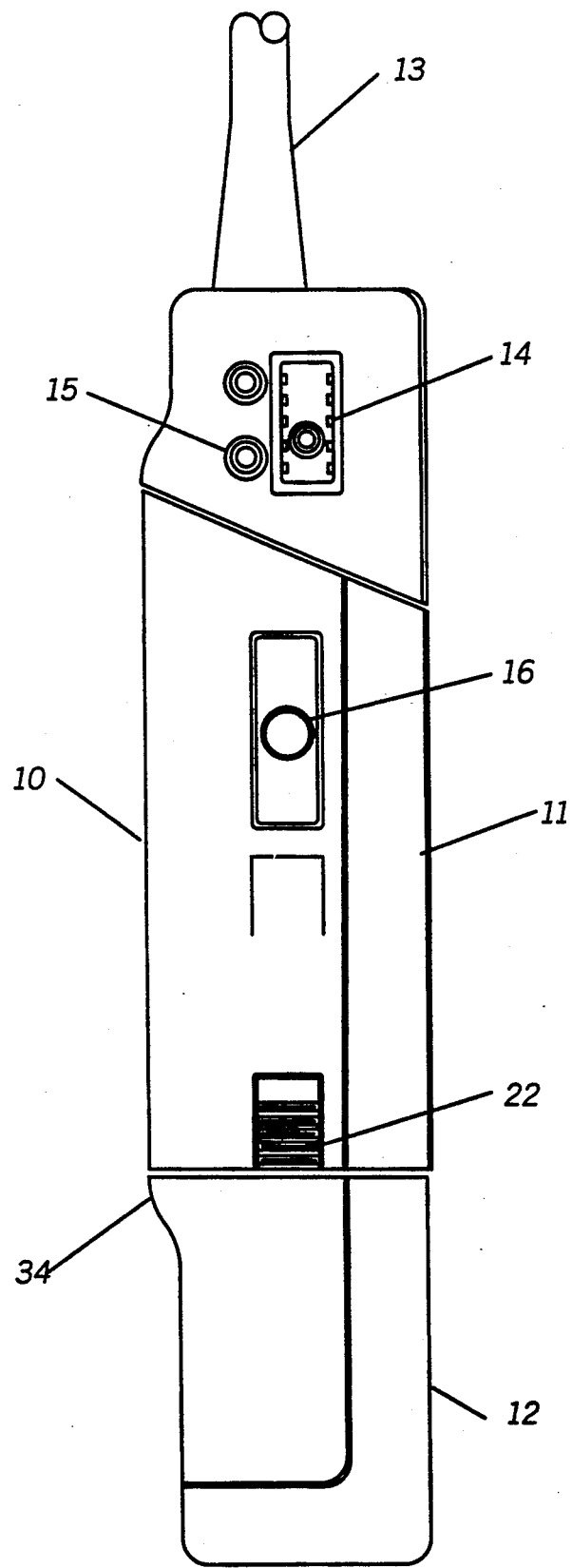
FIG. 1 is a side elevational view of a portable radio in accordance with the present invention.

Referring now by characters of reference to the drawings, and first to FIG. 1, it will be understood that radio 10 includes a radio portion 11 and a battery or battery portion 12. The battery and radio portions are operatively coupled together to form the assembled radio 10. As is conventional, the battery 12 can be detached from the radio portion 11 for replacement with another battery.

The radio 10 can comprise a two-way radio which typically includes an antenna 13 carried by the radio portion 11. Various connectors such as an accessory connector 14 and a rf connector 15 can be provided. A push-to-talk switch 16 is also provided on the two-way radio.

A lock or latch 22 is utilized for preventing the battery 12 from inadvertently separating from the radio portion 11. Various attachment arrangements are utilized for mechanically interconnecting the battery and radio portion. Well known arrangements include both twist-off and slide-off arrangements.

Figure 3:
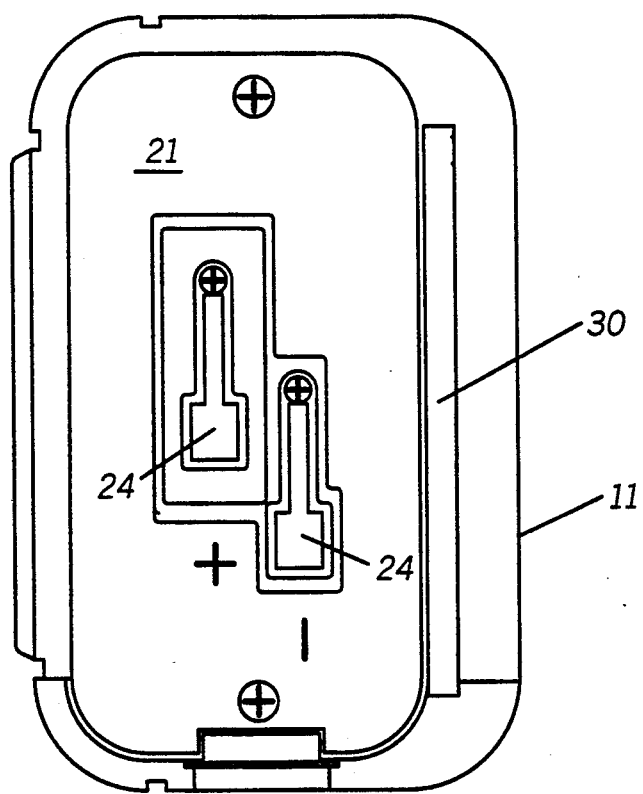
FIG. 3 bottom plan view of the radio portion of the radio of FIG. 1.
Figure 4:
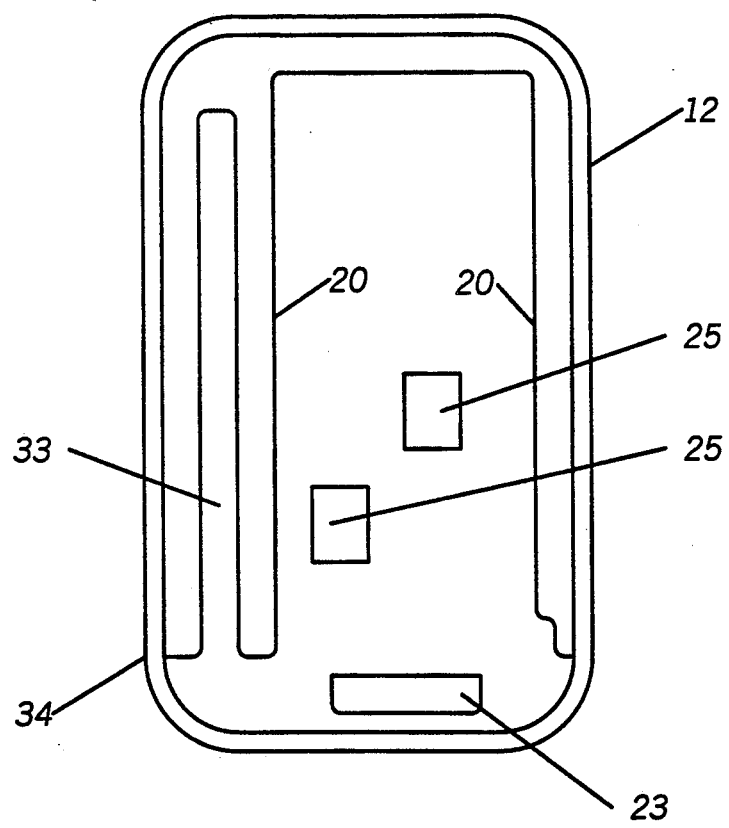
FIG. 4 is a top plan view of the battery portion of the radio of FIG. 1.

In the preferred embodiment, a conventional battery slide-on arrangement is utilized. The battery 12, as seen in FIG. 4, includes opposed lips 20 which engage a base plate 21 on the bottom of the radio portion 11, illustrated in FIG. 3. The battery latch 22 engages a notch 23 on the top of battery 12. Mating radio contacts 24 and battery contacts 25 are provided for the electrical interconnection of the two radio portions.

Figure 2:
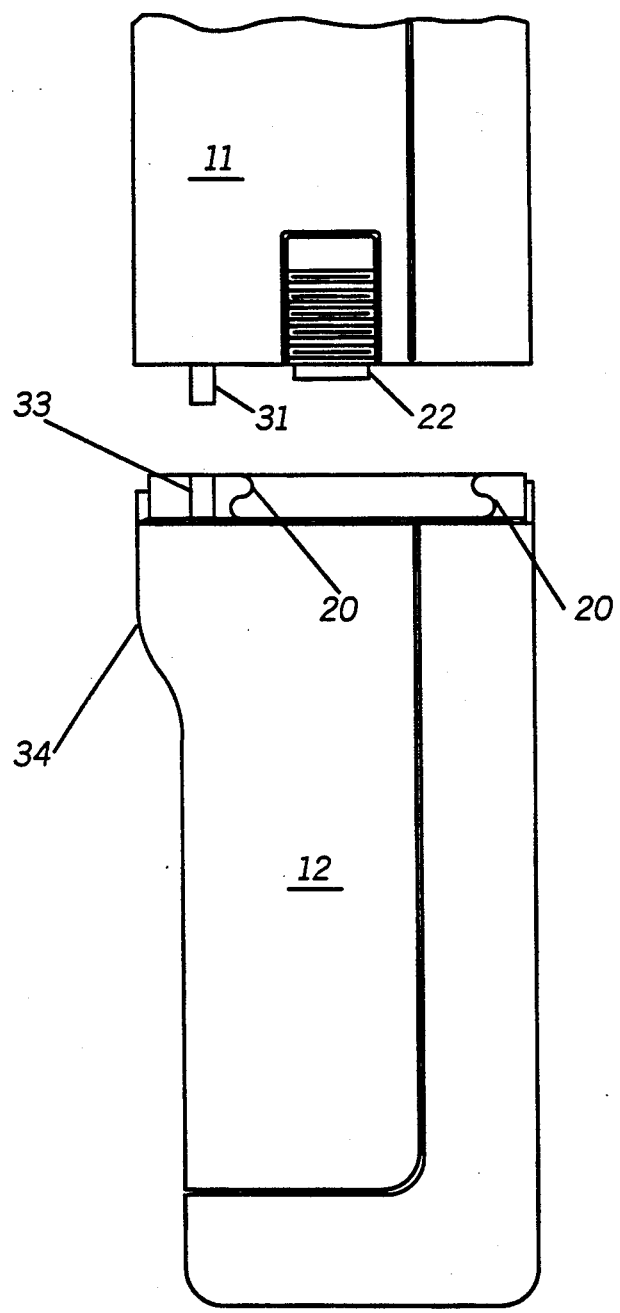
FIG. 2 is a fragmentary exploded side elevational view of the radio of FIG. 1.

An access slot 30 or opening (shown in FIG. 3.) is provided in the bottom of the radio portion 11 for receiving a removable electronic card 31 (shown in FIG. 2). The card 31 can be a memory or ROM card, or can include active circuitry digital, audio, and/or rf, depending on what options the radio 10 is configured to accept. In the preferred embodiment, the card 31 contains program information useable by the radio 10.

When the radio 10 is assembled, the battery portion 12 covers and protects the electronic card 31 in the slot 30. The battery portion 12 is formed with a groove 33 for capturing the bottom of the electronic card 31, thereby providing additional mechanical protection.

It will be understood, that in order to change or insert the electronic card 31, it is necessary for the user to unlatch and remove the battery 12 from the radio portion 11. Not only does removal of the battery 12 provide access to the electronic card 31, but as a consequence of having to remove the battery from the radio portion 11, it is assured that power is not applied to the radio portion during the time the electronic card is being changed. This can be important when the card 31 contains digital circuitry that might be damaged by electric discharge that might occur when the card is inserted or remove from a powered connection. As is most clearly seen in FIG. 2, the battery portion 12 includes a bumped out lip area 34, where at least a portion of the groove 33, constituting electronic card retaining means, is located.

We claim as our invention:

1. A portable radio and electronic card assembly comprising:

a radio portion; and a battery portion removably attached to the radio portion;

the radio portion including an opening for receiving the electronic card, the opening being inaccessible when the radio portion and the battery portion are interconnected and being accessible for insertion or removal of the electronic card when the battery portion is detached from the radio portion, the battery portion including a groove for retaining the electronic card.

2. A portable radio and electronic card assembly as defined in claim 1 in which the battery portion includes a lip and at least a portion of the groove for retaining the electronic card is located on the lip.

3. A portable radio and electronic card assembly as defined in claim 1, in which the portable radio is a two-way radio.

4. A portable two-way radio and electronic card assembly as defined in claim 3 in which the battery portion is slideably attached to the radio portion.

5. A portable two-way radio and electronic card assembly comprising:
- a radio including an opening for receiving the electronic card;
- a battery slideably attached to the radio and including a groove for capturing the electronic card;
- the radio opening being inaccessible when the radio and the battery are interconnected and being accessible for insertion or removal of the electronic card when the battery is detached from the radio.

* * * * *